United States Patent [19]

Ivanov et al.

[11] 3,917,289

[45] Nov. 4, 1975

[54] MECHANICAL SEAL

[76] Inventors: Viktor Vasilievich Ivanov, ulitsa Krasnoprudnaya 26 kv. 26; Boris Sergeevich Goritsky, proezd Shokalskogo 29 korpus 1, kv. 4, both of Moscow, U.S.S.R.

[22] Filed: Aug. 15, 1973

[21] Appl. No.: 388,417

[30] Foreign Application Priority Data
July 30, 1971  U.S.S.R............................. 1680830

[52] U.S. Cl................................. 277/74; 277/96
[51] Int. Cl.²...................... F16J 15/40; F16J 15/54
[58] Field of Search............. 277/3, 25, 27, 74, 94, 277/96, 96 A, 71, 75

[56] References Cited
UNITED STATES PATENTS

| | | | |
|---|---|---|---|
| 1,876,515 | 9/1932 | Emmet.................................... | 277/3 |
| 2,247,505 | 7/1941 | Kohler................................... | 277/74 |
| 2,928,685 | 3/1960 | Tracy..................................... | 277/74 |
| 2,945,706 | 7/1960 | Franked................................. | 277/74 |
| 3,433,489 | 3/1969 | Wiese..................................... | 277/74 |
| 3,527,465 | 9/1970 | Guinard................................. | 277/74 |

FOREIGN PATENTS OR APPLICATIONS 1,241,626  4/1960  France............................. 277/96 A

*Primary Examiner*—Robert I. Smith
*Attorney, Agent, or Firm*—Holman & Stern

[57] ABSTRACT

A mechanical seal having a movable ring and a stationary ring with recesses provided in the opposed faces of said rings. Owing to this arrangement, the resistance to the flow through a clearance between the rings varies depending on the manner in which the recesses in the rings register one with another when the rings rotate relative to each other, the seal operates under the conditions which invariably obey the laws of hydrodynamics.

5 Claims, 5 Drawing Figures

MECHANICAL SEAL

BACKGROUND OF THE INVENTION

The present invention relates to seals, and more specifically to mechanical seals for machine shafts.

This invention may find application in sealing shafts of such machines as, for example, pumps, compressors, turbines and stirrers in all those cases in which it is necessary to eliminate or limit leaks from the machine along a shaft. This becomes a factor of paramount importance when the medium sealed is contained under a high pressure or displays such properties as chemical activity, radioactivity or toxicity.

PRIOR ART

Known in the art is a mechanical seal for machine shafts comprising a movable ring which is attached to the shaft and disposed in the space containing the medium being sealed, and a stationary ring fitted into the body of machine so that an end of the shaft being sealed passes through the stationary ring with a radial clearance, with the movable and stationary rings being so disposed that between their opposed faces is a clearance which is by far smaller than the radial clearance between the shaft and stationary ring.

The movable ring is sealed with respect to the shaft and the stationary ring relatively to the body of machine with the aid of sealing rings disposed in grooves provided in the inner periphery of the movable ring and in the body of the machine where the stationary ring mates the body, respectively.

When a seal of this type is in operation, the medium being sealed finds its way to the face clearance between the rings and then flows from the clearance at a rate which does not exceed the tolerable loss due to leakage. At the same time, the medium lubricates the rings as these rotate one with respect to the other. In general, the performance of such seals is governed by the mechanical properties of the material from which the sealing rings are made, including hardness, wearability, the coefficient of friction coming into play when the rings move one with respect to the other and what may be called the "microgeometry" of the rubbing surfaces, i.e., the magnitude of the surface irregularities within said surfaces. It is the minute surface irregularities alone which eliminate friction of the dry type between the surfaces and provide for lubrication obeying the laws of hydrodynamics.

The magnitude of surface regularities fails to lend itself to control when the seal is in use. Unlike mechanical properties of rings which remain practically the same throughout the period of service life of a seal, the magnitude of surface irregularities is apt to vary with time. These variations can be either of an accidental or systematic nature, both, when the surface irregularities increase in magnitude due to solid particles which may enter the clearance between rings or decrease in magnitude owing to the fact that the surfaces of rings lap to each other. Practical experience goes to show that any deviation of the surface irregularities from an optimum height corresponding to a class $\nabla 10$ or $\nabla 11$ surface finish is apt to impair the performance of the seal.

It stands to reason that the main disadvantage of the known seal is a lack of certainty as to the amount of the medium being sealed which will be lost due to a leak brought about by a change in the magnitude of surface irregularities in a manner which is beyond control. These changes also affect the conditions of lubricating the faces of rings which vary with the time a seal is in use.

As a result, the seal deteriorates and failures are likely to occur such as abnormal leaks of the medium being sealed and sizure of the sealing faces.

There is also known another mechanical seal in which the face of stationary ring is grooved and admitted into the groove through passages is either a sealing fluid or the medium being sealed, cooled and cleaned of solids in advance (see U.S. Pat. No. 3,015,506). A seal of this design fails to eliminate the above disadvantages because the performance of the seal depends on the magnitude of the surface irregularities of the rubbing rings, which is beyond control. The conditions of lubrication, however, improve.

Further known is a mechanical seal with recesses provided in the face of a stationary ring and spaced equidistantly all the way around the circumference so as to form with the face of a movable ring, a plurality of closed chambers connected by passages to a source of a sealing fluid fed intermittently under a pressure somewhat exceeding the pressure of the medium being sealed. To provide for an intermittent and shifted in phase flow of the sealing fluid to the chambers of the seal, use is made of a reciprocating pump in which the number of cylinders is equal to, or a multiple of, the number of chambers in the seal. Alternatively, a phase distributor connected to a source of a sealing fluid fed under a constant pressure may be used. A seal designed on such lines is always lubricated according to the hydrodynamic theory irrespective of the magnitude of the surface irregularities on the rings. Yet, a disadvantage of this seal is its intricate design and the necessity in a source of an intermittent pressure shifted in phase which fails to display adequate reliability.

OBJECTS AND SUMMARY OF THE INVENTION

It is an object of the present invention to eliminate the disadvantages mentioned hereinabove and to provide a mechanical seal for machine shafts which is simple in design and assures that leakage of the medium being sealed is within the tolerable limits irrespective of the magnitude of the surface irregularities on the friction surfaces of the rings.

The above and other objects are attained in a mechanical seal for machine shafts comprising a movable ring which is attached to the shaft and disposed in the space containing the medium being sealed, and a stationary ring fitted into the body of machine so that an end of the shaft being sealed passes through the stationary ring with a radial clearance, with the movable and stationary rings being so disposed that between their opposed faces is a clearance which is by far smaller of the radial clearance between the shaft and stationary ring.

According to the invention, in the opposed faces of the movable ring and the stationary ring, there is provided a plurality of recesses spaced equidistantly all the way around the circumference and defining, when said rings mate each other, closed chambers whose number in the movable ring differs from the number of chambers in the stationary ring.

Owing to this arrangement, the recesses provided in the face of the movable ring define chambers with the recesses and face surface of the stationary ring in succession when the movable ring is rotating. The resistance to the flow through the clearance between the rings varies periodically, bringing about surges in the pressure of the medium contained in the clearance and providing for the operation of the seal invariably under the conditions obeying the laws of hydrodynamics irrespective of the magnitude of the surface irregularities on the friction surfaces of the rings.

In an embodiment of the present invention, at least one of the recesses in the stationary ring is connected by way of a passage provided in said ring to a source of a sealing fluid fed into the clearance between the rings under a constant pressure somewhat exceeding the pressure of the medium being sealed. In a seal of this type there is no leakage of the medium being sealed while the rings are lubricated with the sealing fluid which is free to escape.

In another embodiment of the present invention, each of the recesses in the movable ring is connected through a passage to the space containing the medium being sealed. Seals designed on such lines are used in those cases in which the medium being sealed is a suspension whose particles are likely to accumulate in the chambers of the seal. Flushing of the chambers with the sealing fluid at regular intervals seems to be essential for these seals.

Below will be found a detailed description of the preferred embodiments of the present invention with reference to the accompanying drawings in which:

DETAILED DESCRIPTION OF THE EMBODIMENTS

Figure 1:
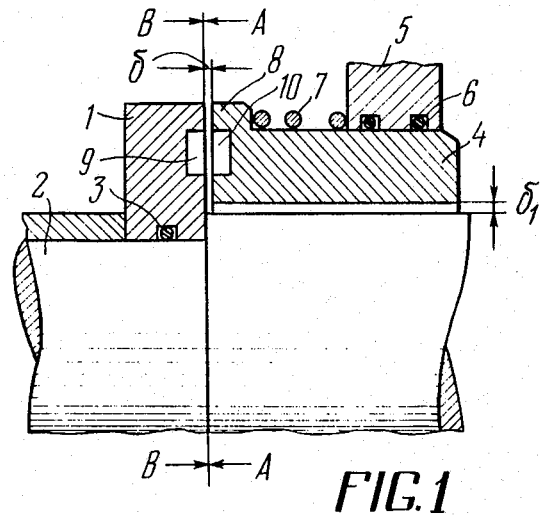
FIG. 1 is a longitudinal section of the mechanical seal according to the invention.

The mechanical seal comprises a movable ring 1 attached to a machine shaft 2 and sealed with respect to said shaft by means of a sealing ring 3, and a stationary ring 4 fitted in a machine body 5. The stationary ring 4 is sealed with respect to the body 5 by sealing rings 6. The movable ring 1 is disposed in a space containing the medium being sealed. Between the opposed faces of the movable ring 1 and the stationary ring 4 there is a clearance, $\delta$, whose width is selected depending on the magnitude of the surface irregularities on the surface of the rings and the amount of the tolerable leak of the medium being sealed. The value of $\delta$ varies over a range from a fraction of a micron to a few microns. Passing through the hole of the stationary ring 4 is an end of the shaft 2 being sealed. To prevent a contact between the shaft and inner periphery of the stationary ring 4, there is provided between the ring 4 and the shaft 2 a clearance $\delta_1$, whose width is by far greater than the width $\delta$ of the clearance between the faces of the rings 1 and 4. For maintaining a constant width of the face clearance between the rings 1 and 4 when the seal is in use, there is provided a spring 7 fitted between the body 5 and a shoulder 8 on the outer side periphery of the ring 4 to accommodate the thrust exerted by the spring 7.

Figure 2:
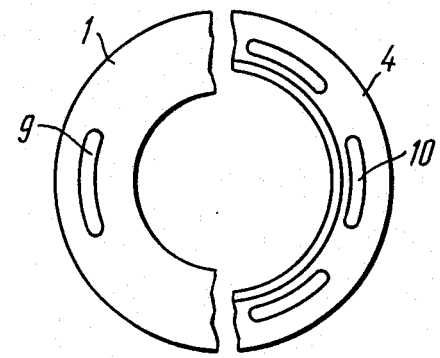
FIG. 2 is an enlarged combined view of FIG. 1, partially fragmentary in the direction of arrow A (at the left) and in the direction of arrow B.

In accordance with the invention, provided in the opposed faces of the movable ring 1 and the stationary ring 4 there is a plurality of recesses 9 and 10, respectively, which are spaced equidistantly all the way around both circumferences of equal diameter. The number of the recesses 9 in the ring 1 differs as a rule from the number of the recesses 10 in the ring 4 (FIG. 2). Generally speaking, the ratio between the number of the recesses 9 and 10 in the rings 1 and 4 is determined by trial and error in each particular case taking into account, before all, such factors as the type of the medium being sealed, the tolerable amount of its leak and the dimensions of the seal proper. In a seal fitted to a shaft 120 mm in diameter rotating at a speed of 2900 rpm in an apparatus containing water under a pressure of 150 atm, the stationary ring 4 has, for example, two recesses in its face whereas the number of recesses in the movable ring varies between one and seven. The medium being sealed leaks at a rate of 200 liters per hour while the tolerable rate of leak is 1500 liters per hour. A seal designed on such lines operates under the conditions which fully obey the laws of hydrodynamics irrespective of the variations in the magnitude of the surface irregularities on the faces of the movable ring 1 and the stationary ring 4.

The recesses 9 and 10, arch-shaped portions of annular grooves, are of the same depth which is by far greater than the width $\delta$ of the clearance between the rings 1 and 4. The volume of the recesses 9 and 10 is calculated predominantly in those cases in which the medium being sealed is a gas. The recesses 9 and 10 form closed chambers when the rings mate each other.

In an embodiment of the invention, each of the recesses 10 (FIG. 3) in the stationary ring 4 is placed into communication through a passage 11 with a source of sealing fluid, such as a pump or a tank under a pressure (not shown), with the pressure of sealing fluid exceeding somewhat the pressure of the medium being sealed. A seal designed in this way is suitable for use when no leak of the fluid being sealed is tolerable, as is the case for circulation pumps of atomic power stations.

If the medium being sealed is a finely dispersed suspension whose particles are likely to settle in, and block, the chambers of the seal, flushing of said chambers at regular intervals calling for the disassembly of the seal becomes inevitable. To simplify the process of flushing the chambers, in an embodiment of the invention, the movable ring 1 (FIG. 4) is provided with passages 12 which place each of the recesses 9 in communication with the space containing the medium being sealed.

Figure 5:
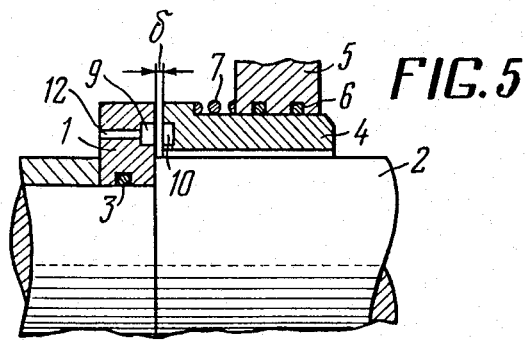
FIG. 5 is a longitudinal section of the mechanical seal according to still a further embodiment of the invention in still a further embodiment.

In all those cases in which the medium being sealed is a viscous one, use is made of a seal illustrated in FIG. 5. As will be noted, only one of the rings, in this particlular case, the movable ring 1, is provided with passages 12 placing each of the recesses 9 in communication with the space containing the medium being sealed.

The mechanical seal operates in the following way: When the machine operates or is filled with a fluid or gas, the medium being sealed, which is contained in the machine under a pressure, fills the face clearance $\delta$ between the rings 1 and 4 and some of the medium is admitted into the annular clearance $\delta_1$ between the shaft 2 and the stationary ring 4.

When the shaft 2 and the movable ring 1 are rotating, the recesses 9 in said ring define chambers with the face of the stationary ring 4 and with the recesses 10 therein in succession. Since the recesses 9 and 10 change their position relative to each other, the resistance to the flow through the clearance δ between the rings 1 and 4 also changes. When the recesses 9 register with the recesses 10, the resistance to the flow through the clearance δ is at its maximum because the average length of the flow of the fluid discharged through the clearance δ is a maximum too. In all those cases in which the recesses 9 or 10 define chambers with the face of the opposed ring, the resistance to the flow through the clearance is a minimum one. When the movable ring 1 is in any of the intermediate positions with respect to the stationary ring 4, the resistance to the flow through the clearance δ is somewhere between its minimum and maximum.

The variations in the resistance to the flow of a fluid under a pressure through the clearance δ bring about pulsations of the pressure in the closed chambers at a frequency decided by the speed of rotation of the shaft 2 and the number of the recesses 9 and 10 in the movable and stationary rings 1 and 4. The amplitude of these pulsations varies with the pressure of the medium being sealed and the rate of changes of the resistance to the flow through the clearance δ. Said pulsations bring about minute oscillations of the stationary ring 4 of the seal with the result that the lubrication in the clearance δ of the seal takes place under the conditions obeying the laws of hydrodynamics.

The optimum frequency and amplitude of pressure pulsations in the closed chambers of the seal which provide for a minimum leak of the medium vary with the dimensions of the seal, pressure gradient, density and viscosity of the medium being sealed and are determined, as a rule, by trial and error as shown in the above mentioned example. A point to be noted is that the frequency of pressure pulsations should not be in resonance with the frequency of natural oscillations of the elements of the seal.

Figure 3:
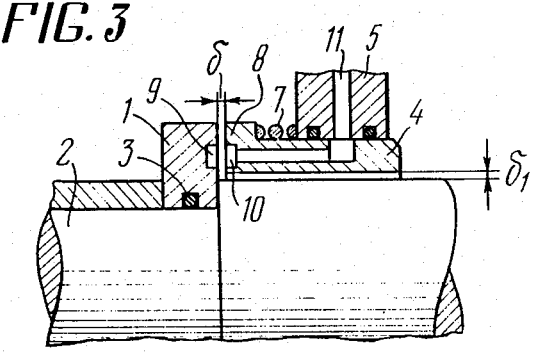
FIG. 3 is a longitudinal section of the mechanical seal according to another embodiment of the invention.

When no leak of the medium being sealed is tolerable, use is made of the seal shown in FIG. 3. In this latter case, simultaneously with the filling of the machine with the medium, a source of sealing fluid is turned on, feeding said fluid under a pressure to the face clearance δ through the passages 11 provided in the stationary ring 4. Since the pressure of sealing fluid somewhat exceeds the pressure of the medium being sealed and a leak of the sealing fluid is tolerable, the sealing fluid forces the medium being sealed out of the face clearance and some of the sealing fluid leaks through the annular clearance δ₁ between the stationary ring 4 and shaft 2.

Figure 4:
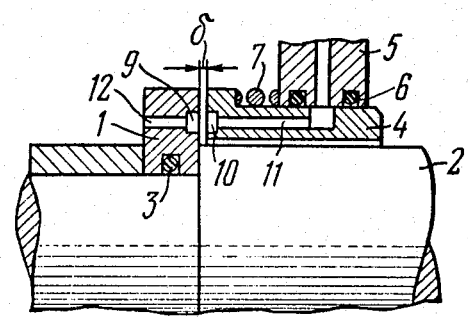
FIG. 4 is a longitudinal section of the mechanical seal according to yet another embodiment of the invention.

When the medium being sealed is a finely dispersed suspension of solid particles in a fluid which are likely to settle in the recesses 9 and 10 of the movable ring 1 and stationary ring 4, use is made of the seal illustrated in FIG. 4. Since in this case, the pressure of sealing fluid also exceeds the pressure of the medium being sealed, the sealing fluid forces the medium being sealed out of the recesses 9 and 10 and passes into the passage 12 so as to enable the recesses 9 and 10 to be flushed. During this operation, partial intermixing of the medium being sealed with the sealing fluid takes place.

When there is a need to increase the amplitude of pressure pulsations, the recourse is to the seal shown in FIG. 5. In this seal, the pressure in the chambers varies not only with the resistance to the flow through the clearance δ but also with the relative position of the recesses 9 and 10 in the movable ring 1 and stationary ring 4. In other words, when a recess 10 of the stationary ring 4 registers with a recess 9 of the movable ring 1, the pressure inside the chambers so defined sharply increases to a point in which it is equal to the pressure of the medium being sealed which is admitted into the chambers through the passages 12. As result, the viscous medium being sealed is expelled into the face clearance δ and provides thus for the lubrication of the rings of the seal.

What is claimed is:

1. A mechanical hydrodynamic seal for a machine shaft comprising: a shaft and first ring fitted to the shaft and rotatable therewith; said ring being disposed in a space for containing a fluid medium being sealed; a second stationary ring disposed in the body of the machine coaxially with said first rotary ring so that an end of said shaft being sealed passes that the stationary ring with a radial clearance; said movable and stationary rings being so disposed that between opposed faces thereof there is an annular clearance which is substantially smaller than the radial clearance between said shaft and the stationary ring; said movable and stationary rings each being provided with a plurality of recesses in their opposed faces about a common circumference; said movable ring having recesses which vary in number from the number of the recesses in said stationary ring; wtih the recesses in said movable and stationary rings successively defining substantially closed chambers when the recesses mate each other during relative rotation.

2. The mechanical seal as claimed in claim 1 in which at least one of the recesses in the stationary ring is connected by a passage provided in said stationary ring to a source of a sealing fluid fed into the clearance between the rings under a constant pressure somewhat exceeding the pressure of the medium being sealed.

3. The mechanical seal as claimed in claim 1 in which each of the recesses in the movable ring is connected through a passage to the space containing the medium being sealed.

4. The mechanical seal as claimed in claim 2 in which each of the recesses in the movable ring is connected through a passage to the space containing the medium being sealed.

5. The mechanical seal as claimed in claim 1, in which said recesses in the respective rings are arcuate.

* * * * *